Patented May 4, 1926.

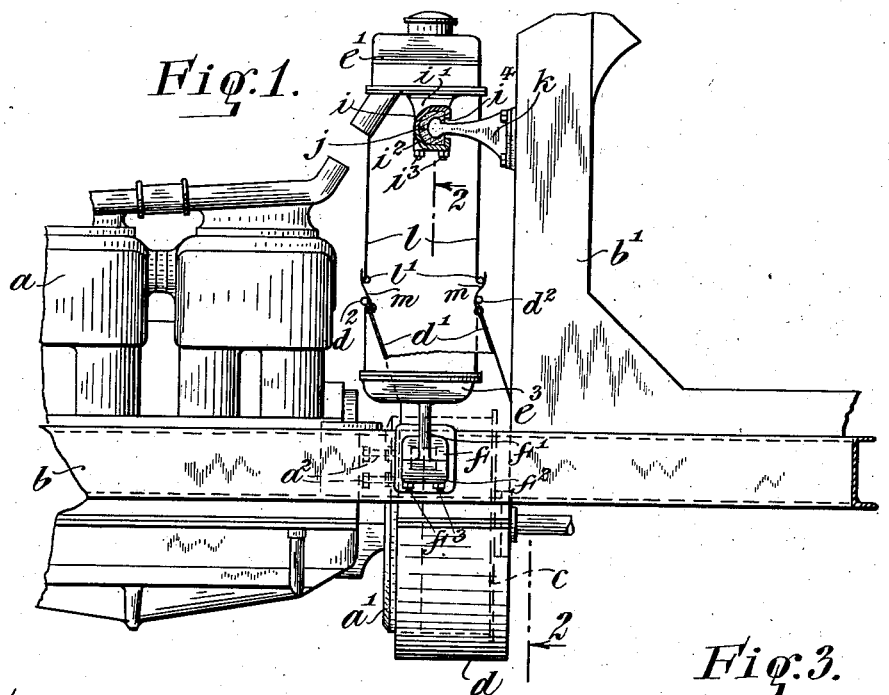

1,583,548

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

CUSHION SUPPORT FOR RADIATORS.

Application filed September 5, 1924. Serial No. 736,007.

*To all whom it may concern:*

Be it known that I, ERVING R. GURNEY, a citizen of the United States, residing in Beechhurst, Long Island, in the State of New York, have invented certain new and useful Improvements in Cushion Supports for Radiators, of which the following is a specification, reference being had to the accompanying drawings, forming a part hereof.

This invention relates to radiators for motor vehicles. One object of the invention is to so mount a motor vehicle radiator as to relieve it, in whole or in part, of the strains and stresses incident to the weaving of the vehicle frame in passing over inequalities in the roadway. To this end there is provided a three-point support for the radiator from the vehicle frame. More particularly the radiator may be supported, near the lowermost portion thereof, directly from the vehicle frame by connections disposed at either side of the radiator as with the side frame members of the chassis to comprise two of the points of support. The third point of support may comprise a connection between the radiator near its upper portion and the vehicle dash which in turn is carried with the chassis. Another object of the invention is to relieve to a degree the radiator when so supported, of the shocks and vibrations set up in the chassis frame. To this end the connections comprising the radiator supports are formed of yielding non-metallic material, such as rubber, which serves to cushion the radiator and absorb, in whole or in part, the shocks and vibrations which would otherwise be impressed with undiminished intensity upon the radiator. In practice, blocks of the yielding non-metallic material may most conveniently be retained within housings carried with the radiator to engage the ends of arms carried with the chassis frame and vehicle dash and entering the housings. Preferably the yielding non-metallic material is retained in the housings under compression whereby its strength, resiliency and wearing qualities are increased. The invention is particularly applicable to radiators for motor vehicles of the kind in which a current of air is blown past the radiator tubes by a fan driven from the engine. Radiators of this nature have heretofore been proposed in which a bank of tubes upon either side thereof are connected to spaced lower tanks and are suspended from a common upper tank. The upper tank and with it the radiator as a whole is supported by an air duct carried with a cross element of the chassis frame which supports the engine. The air duct is usually formed of sheets of heavy metal such as sheet steel surrounding a fan driven by the motor and directs the air upwardly and outwardly through the banks of tubes upon both sides of the vehicle. In the previous construction the entire radiator was supported by the air duct and great difficulty was encountered in providing a structure of sufficient rigidity to withstand the shocks and stresses impressed upon the radiator under conditions of heavy duty. According to the present invention it is proposed to construct the tanks and tubes as a rigid whole and support the same by means of connections which will cushion the shocks and vibrations impressed upon the frame and prevent in whole or in part their transmission to the radiator. It is proposed to suspend the upper portion of the air duct from the upper tank and to support the lower portion of the air duct and the fan housing from the motor. To permit relative motion between the duct sections as might arise upon weaving of the frame, etc., it is proposed to connect the sections by means of a flexible air-tight connection. The radiator structure which comprises lower tanks disposed upon opposite sides of the vehicle and from which radiator tubes extend vertically to connect with a single upper tank is supported at three points from the chassis by yielding non-metallic mechanical cushion connections. To compensate for relative movement between the sections of the air duct flexible connections either of metal or fabric are inserted therebetween. The invention will now be described more particularly in connection with the accompanying drawings illustrating a preferred embodiment thereof and in which:

Figure 1 is a view in side elevation partly in section showing a fragmentary portion of the chassis frame, prime mover and dash of a motor vehicle and radiator support according to the present invention and provided with a sectional air duct with flexible connections between the sections.

Figure 2 is a view taken in the planes indicated by the broken line 2—2 in Figure 1 and looking in the direction of the arrows.

Figure 3 is a view showing a modification of the flexible connections between the duct sections.

Figure 4 is a view showing another modification of the flexible connections of the air duct.

Referring to the drawings the motor $a$ may be supported in any conventional manner from the chassis frame of the vehicle, the side members of which are indicated at $b$ and the vehicle dash at $b'$. Integral with the fly wheel $a'$ of the motor is a fan preferably of the centrifugal type which is indicated in dotted lines at $c$. Enclosing the fan is a fan housing $d$ which is rigidly supported from the motor $a$ by the bolts $x^2$. It will be appreciated that the fan housing must be rigid with the motor in order that it may always surround the fan carried by the fly wheel for efficient operation thereof. The air drawn in near the axis of the fan is expelled at its periphery and flows in the direction of the arrows (Figure 2) upwardly and is deflected outwardly by the usual deflector (not shown) through the banks of radiator tubes $e$, $e$, disposed upon opposite sides of the vehicle. The radiator tubes connect at their upper ends with a common tank $e'$ and are connected at their lower ends to individual tanks $e^2$, $e^3$ communicating with each other through the conduit $e^4$.

According to the present invention the banks $e$, $e$ of radiator tubes and tanks $e'$, $e^2$, $e^3$ form a rigid whole which is to be supported independently of the fan housing from the vehicle chassis by means of yielding non-metallic cushion connections adapted to cushion or absorb shocks and stresses impressed upon the vehicle frame and prevent their transmission in whole or in part to the radiator. To this end a housing $f$ is supported as by brackets $f'$ from each of the lower tanks $e^2$, $e^3$, respectively and an arm $g$ is supported from a side frame member of the chassis and is adapted to enter the housing $f$ and be engaged by yielding non-metallic material $h$ contained within the housing. The yielding non-metallic material may conveniently comprise rubber and preferably it is maintained under internal static pressure whereby its strength, resiliency and wearing qualities are materially increased. In order to maintain the material under compression the housing is preferably formed in two parts, the lower portion $f^2$ being separate from the rest of the housing $f$ and adapted to be secured thereto by bolts $f^3$ serving to draw the two parts of the housing together to compress the yielding non-metallic material contained therein. Preferably the housing sections are so formed as to provide an opening in the side thereof facing the side frame member of the chassis and it is through this opening that the arm $g$ enters. A similar housing $i$ is carried by means of bracket $i'$ centrally of the underside of tank $e'$. A block of yielding non-metallic material $j$ is similarly contained within housing $i$ and is maintained under compression by the lower housing section $i^2$ by means of the bolts $i^3$. The arm $k$ which enters the open side $i^4$ of the housing and is engaged by the yielding non-metallic material $j$ is adapted to be carried in suitable manner by the dash $b'$. It will be observed that the radiator i. e. the upper and lower tanks and the radiator tubes is supported wholly from the chassis either directly through the connections with the side members $b$ or through the connections with the dash $b'$ which is directly supported upon the chassis. Supported from the upper tank $e'$ is the upper section $l$ of the air duct, the lower edge of which terminates in proximity to the upper edge of the air duct $d'$ forming an extension of the fan housing $d$.

It will be apparent that as the vehicle chassis weaves in passing over inequalities in the road the radiator and air duct section $l$ will have a tendency to move correspondingly while the air duct section $d'$ which is rigidly supported from the motor which in turn will be most likely supported from the vehicle chassis through a three-point suspension as is customary will not move correspondingly and there will be consequently relative movement between the respective air duct sections. In order to provide an air-tight union therebetween and at the same time allow for relative movement between the air duct sections it is proposed, according to the present invention, to provide flexible connections between the lower edge of the upper air duct sections $l$ and the upper edge of the lower air duct sections $d'$. Accordingly, in the modification illustrated in Figures 1 and 2 strips $m$ of brass or other flexible metal are secured, for instance on the inner side of the lower air duct section $d'$ and extend outwardly between the proximate ends of the air duct sections to slidingly engage the outer side of the upper air duct section. Preferably the proximate edges of the sections are provided with a bead as at $l'$, $d^2$, respectively, to facilitate the movement of the air duct sections thereover. It will of course be apparent that the metallic strips $m$ might efficaciously be secured in reversed position to the upper duct section $l$.

Instead of using flexible metallic connections between the respective edges of the air duct sections it is within the purview of the invention to connect the adjacent edges by a flexible non-metallic connection such as strips of fabric $n$ secured at their edges to the respective edges of the upper and lower air duct sections $l$ and $d'$ with sufficient material therebetween to allow play between the respective sections.

If desired additional strips $o$ may be secured as indicated in Figure 3 to further ensure an air-tight joint. Figure 4 illustrates a modification of the arrangement disclosed in Figure 3 in which the upper edges of the fabric strips are turned over and connected together to form a yielding recess to receive the proximate edge of the upper air duct section.

It will thus be seen that a construction has been provided which affords strength and rigidity in a radiator for motor vehicles and a direct support for the same from the chassis while at the same time the shocks and stresses which would ordinarily be received from the chassis frame are cushioned. An efficient conduit is also afforded between the motor driven fan and radiator tubes which is unaffected by variations in the relative position of the radiator and fan housing.

The invention is not to be considered limited to the particular type of radiator disclosed and various modifications may be made in the arrangement and disposition of parts as well as in the type of non-metallic connections used.

What I claim is:

1. In a cooling device for motor vehicles, a radiator, means to resiliently mount the same on the vehicle chassis, a fan housing, means to mount the latter rigidly on the chassis, air ducts carried by the housing and radiator, and yielding means to connect the latter.

2. In a cooling device for motor vehicles, a fan housing, air ducts therein, and means to mount the same rigidly on the vehicle frame, upper and lower radiator tank sections with interconnecting tubes, means on each tank section to mount the whole resiliently on the frame, air ducts in the radiator and yielding means to connect the latter with the air ducts of the fan housing.

3. In a cooling device for motor vehicles, a fan housing, air ducts therein and means to mount the same rigidly on the vehicle frame, a sectionalized radiator, means associated with a plurality of the sections for resiliently mounting the radiator, said means comprising a three point supporting means, air ducts in a plurality of the sections of the radiator and yielding means to connect the latter with the air ducts of the fan housing.

This specification signed this 3rd day of September A. D. 1924.

ERVING R. GURNEY.